United States Patent [19]

Armour

[11] 3,817,678

[45] June 18, 1974

[54] EJECTOR FOR PLASTIC INJECTION BLOW MOLDING MACHINE

[75] Inventor: Donald F. Armour, Bloomfield, Conn.

[73] Assignee: Package Machinery Company, East Longmeadow, Mass.

[22] Filed: July 10, 1972

[21] Appl. No.: 269,964

[52] U.S. Cl. .................. 425/438, 425/DIG. 209, 425/DIG. 232, 425/441
[51] Int. Cl. ............................................... B29c 7/00
[58] Field of Search .......... 425/444, 441, 436, 438, 425/DIG. 209, DIG. 232

[56] References Cited
UNITED STATES PATENTS

| | | | |
|---|---|---|---|
| 3,264,684 | 8/1966 | Moslo | 425/438 X |
| 3,635,635 | 1/1972 | Moslo | 425/441 X |

*Primary Examiner*—Richard B. Lazarus
*Attorney, Agent, or Firm*—McCormick, Paulding & Huber

[57] ABSTRACT

An ejector for a plastic injection blow molding machine which comprises a sleeve slidable on the base portion of the parison pin or core pin associated with such machine. The sleeve has a pair of oppositely extending wings, each of which is associated with one half of the two-piece neck ring which is also associated with such machine. Each such wing and its associated neck ring half are provided with cooperating cam means which is operable upon closing and opening movement of the neck ring halves to slide the ejector sleeve on the core pin. When the neck ring halves are closed to define the complete neck ring, the end of the ejector sleeve defines the edge of the plastic parison formed on the pin. When the neck ring halves are separated after the parison has been blown to final shape and size, the sleeve is moved to strip the finally shaped product from the core pin.

3 Claims, 2 Drawing Figures

EJECTOR FOR PLASTIC INJECTION BLOW MOLDING MACHINE

BACKGROUND OF THE INVENTION

Plastic injection blow molding machines employ core pins or parison pins which are located in an injection mold to receive molten plastic and thereby to form the parison around the pin. Neck ring halves close upon the base portion of the pin to retain the parison on the pin when it is moved from the injection mold or parison mold to the final shaping or blow mold. After blowing, the blow mold is opened and the neck ring halves are separated or opened also. The finished product which is then clinging to the core pin is sometimes difficult to dislodge, even with the blowing of air into the finished product.

It is an object of the present invention to provide a simple structure which will assist in ejecting or stripping the finished product from the parison pin.

SUMMARY OF THE INVENTION

As will be described in more detail hereinafter, the finished product ejector provided in accordance with this invention is utilized in a plastic injection blow molding machine of the type having a core or parison pin and a separable neck ring which includes two halves movable into engagement with each other around the core pin to define therewith the neck portion of the parison formed on the pin. The ejector comprises a sleeve slidably mounted on the base portion of the core pin and it has an end facing away from the base which is engaged by molten plastic and defines the edge of the neck end of the parison which becomes the open end of the finished product. The neck ring halves are adapted to engage and embrace the sleeve and to surround in spaced relationship a portion of the core pin projecting beyond the said end of the sleeve when the neck ring halves are engaged and closed. The said neck ring halves and ejector sleeve are provided with cooperating means for sliding the sleeve toward the base end of the core pin when the neck ring halves are moved into engagement and for sliding the sleeve in the opposite direction and thus to strip the finished product from the core pin when the neck ring halves are moved away from each other.

DESCRIPTION OF THE PREFERRED EMBODIMENT

Figure 1:
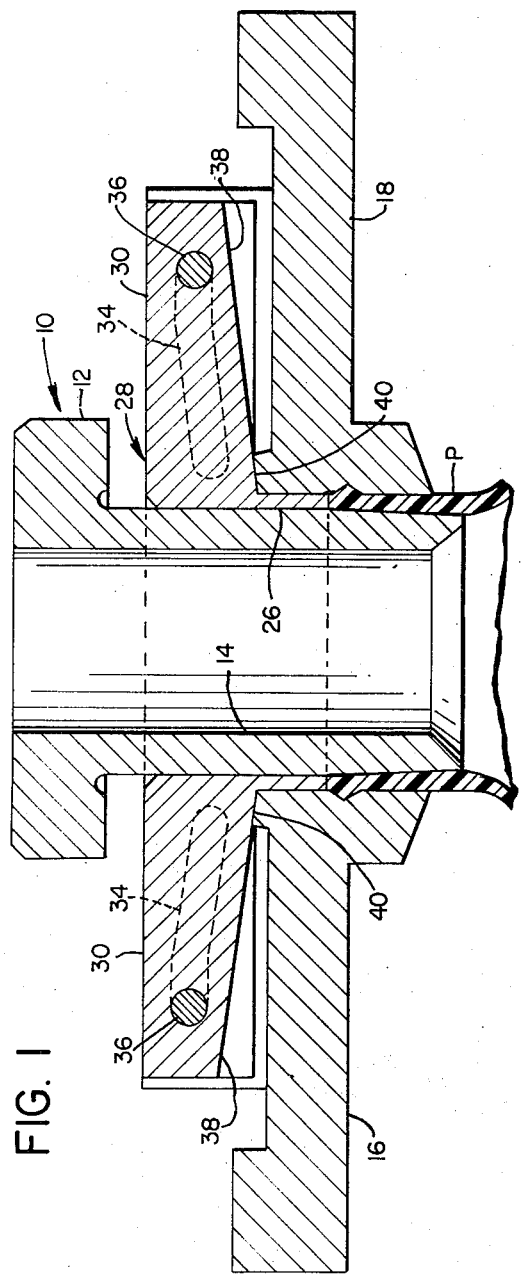
FIG. 1 is a longitudinal cross-sectional view taken through an exemplary core pin and showing the neck ring halves and associated ejector sleeve.

An exemplary core pin which might be used in a plastic injection blow molding machine is indicated generally by the reference number 10 and it includes a base 12 and a projecting body portion 14. A complete core pin is not shown, and such complete pin may include elements which can be inserted within the bore of the body portion 14 and which will extend away from the base 12 substantially farther than the body portion which is shown. However, so much of the core pin 10 is shown as is needed to cooperate with a pair of neck ring halves 16 and 18 in forming the neck end portion P of a plastic parison which then becomes the neck end portion of a finished plastic article after that article has been blown into final size and shape.

The neck ring halves conventionally used in association with a core pin engage each other while surrounding the core pin and they generally have portions such as the portions 20, 20 shown on the neck ring halves 16 and 18 which snugly embrace the body portion 14 of the core pin. They also conventionally have grooves 22, 22 which will define a bead B on the parison P and they also have portions 24, 24 which surround the projecting body 14 of the core pin in spaced relationship to define the neck portion N of the parison P. In such conventional constructions, the portions 20, 20 of the neck ring halves which engage the body of the core pin define the edge or "finish" of the parison which becomes the open end of the final blown product.

In keeping with the present invention, the neck ring portions 20, 20 do not engage the body of the parison pin but instead engage an end portion 26 of the ejector sleeve which is indicated generally by the reference number 28. It will be seen that the said end portion 26 of the sleeve faces away from the base 12 of the core pin 10 and it is engaged by the molten plastic in forming the parison within the injection mold and thus it cooperates with the core pin and with the neck ring halves to define the edge or "finish" of the parison and final product.

As was mentioned before, the ejector sleeve 28 is slidable on the body 14 of the core pin 10, and this sliding movement is accomplished by the opening and closing movement of the neck ring halves 16 and 18. This is provided for by cooperating cam means including a pair of wings 30, 30 on the ejector sleeve, one such wing being associated with each of the separable neck ring halves 16 and 18.

Figure 2:
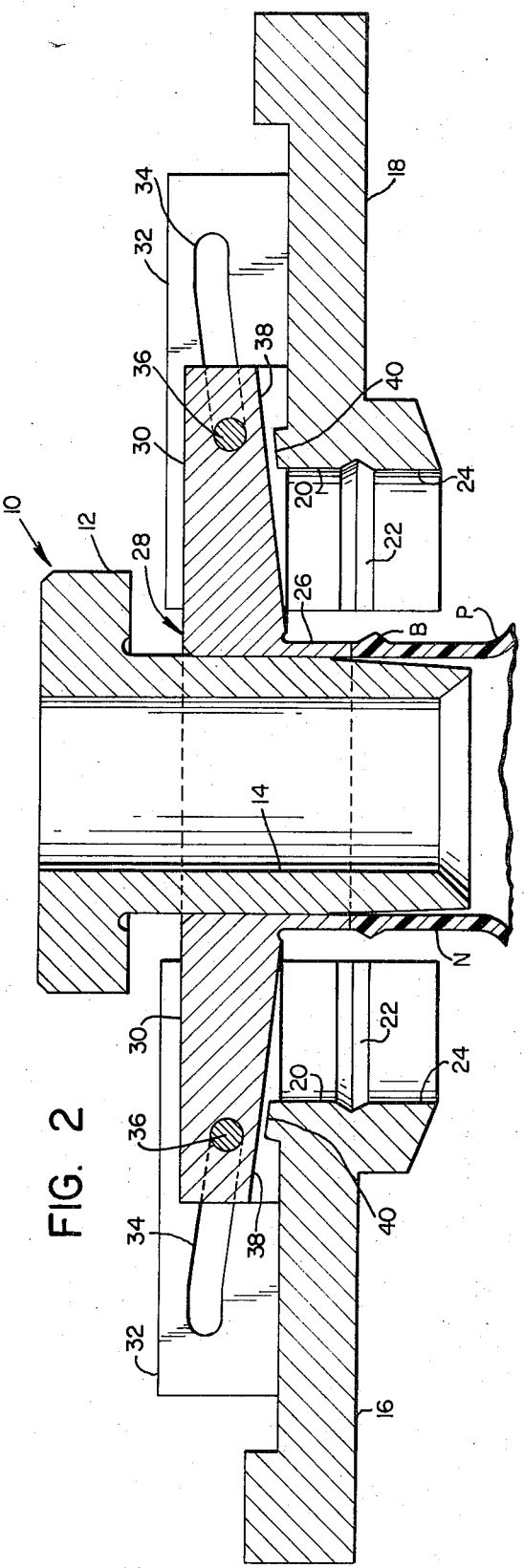
FIG. 2 is a view similar to FIG. 1 but shows the arrangement wherein the neck ring halves have been separated.

The cooperating cam means also includes a pair of flanges 32, 32 provided on each neck ring half, one such flange being disposed at each side of the ejector sleeve wing 30 with which the particular neck ring half is associated. A cam slot 34 is defined in each flange 32 and has a portion thereof formed at an acute angle to the path of movement of the neck ring halves 16 and 18 as they are moved toward and away from each other in the closing and opening operation of the neck ring. A cam following pin 36 is secured transversely in each ejector sleeve wing 30 with its ends extending into the slots 34, 34 on the neck ring half with which its wing is associated. Thus, as the neck ring halves 16 and 18 are moved toward each other or toward the closed neck ring condition, the ejector sleeve 28 is cammed to slide toward the base 12 of the core pin 10. When the neck ring halves are moved away from each other in the opening operation of the neck ring, the ejector sleeve 28 is moved on the core pin 10 away from its base 12 thus to thrust or strip the finished product from the body 14 of the core pin as shown in FIG. 2.

The cooperating cam means also includes a surface 38 on the face of each ejector sleeve wing 30 facing away from the base 12, the said surface 38 being tapered at the same angle provided in the cam slots 34, 34. A camming projection 40 is provided on each neck ring half and it has a tapered surface complementary to the surface 38 and which engages said complementary surface as the neck rings are moved into closed condition to assure that the ejector sleeve 28 is moved toward the base 12 so as to be in position to define the edge or "finish" of the parison.

I claim:

1. A finished product ejector for a plastic injection blow molding machine of the type utilizing a core or parison pin and a separable neck ring which includes two halves movable into engagement with each other around the core pin to define therewith the neck portion of the parison formed on the pin and to retain the parison on the pin until it is blown to final product shape and size, the said ejector comprising a sleeve slidably mounted on the core pin and having an end facing in one direction to be engaged by molten plastic and thus to define the edge at the neck end of the parison which becomes the open end of the finished product, the neck ring halves being adapted to engage and embrace said sleeve and to surround in spaced relationship a portion of the core pin projecting beyond said end of the sleeve when the said neck ring halves are engaged and closed, the said sleeve having a pair of oppositely extending wings each of which is associated with a respective one of said neck ring halves and each of which carries a cam following pin, and the said neck ring halves having a path of movement toward and away from each other laterally of the core pin and each having at least one flange provided with a cam slot disposed at an angle to the said path of movement and receiving the cam following pin on its associated wing of the ejector sleeve, the cam slots in the flanges on the neck ring halves being adapted to effect sliding movement of the sleeve on the core pin in a direction opposite to said end of the sleeve when the neck ring halves are moved toward engagement with each other and to effect sliding movement of the sleeve in a direction toward its one end and thus to strip the finished product from the core pin when the neck ring halves are moved out of engagement with each other.

2. The construction of claim 1 wherein there are two such flanges on each neck ring half, arranged one on each side of the associated ejector sleeve wing.

3. The construction of claim 2 wherein the surface of each ejector sleeve wing facing toward the said end of the sleeve is provided with a taper at an angle substantially equal to the cam slot angle, and wherein the neck ring halves are each provided with a camming projection complementary to the tapered surface of the wing and engaging said tapered surface when the neck ring halves are moved into engagement.

* * * * *